United States Patent
Bruner et al.

(10) Patent No.: US 7,471,503 B2
(45) Date of Patent: Dec. 30, 2008

(54) SOLID ELECTROLYTIC CAPACITORS

(75) Inventors: Eric L. Bruner, San Diego, CA (US); Udo Merker, Cologne (DE)

(73) Assignees: Aculon, Inc., San Diego, CA (US); H.C. Starck GmbH, Leverkusen (DE)

( * ) Notice: Subject to any disclaimer, the term of this patent is extended or adjusted under 35 U.S.C. 154(b) by 3 days.

(21) Appl. No.: 11/731,723

(22) Filed: Mar. 30, 2007

(65) Prior Publication Data

US 2007/0230092 A1 Oct. 4, 2007

Related U.S. Application Data

(60) Provisional application No. 60/788,290, filed on Mar. 31, 2006.

(51) Int. Cl.
*H01G 9/02* (2006.01)
*H01G 9/04* (2006.01)

(52) U.S. Cl. ...................... 361/525; 361/528

(58) Field of Classification Search .......... 361/523–528
See application file for complete search history.

(56) References Cited

U.S. PATENT DOCUMENTS

| | | | |
|---|---|---|---|
| 4,858,078 A | 8/1989 | Morimoto et al. | 361/527 |
| 5,729,428 A | 3/1998 | Sakata et al. | 361/523 |
| 6,515,848 B1 * | 2/2003 | Yoshida et al. | 361/525 |
| 6,731,495 B2 | 5/2004 | Kumar et al. | 361/312 |
| 6,912,113 B2 | 6/2005 | Kumar et al. | 361/301.4 |
| 6,982,865 B2 | 1/2006 | Kawata et al. | 361/525 |
| 6,987,663 B2 | 1/2006 | Merker et al. | 361/523 |
| 6,992,880 B2 | 1/2006 | Tadanobu et al. | 361/523 |
| 2005/0162815 A1 | 7/2005 | Tseng et al. | 361/523 |

FOREIGN PATENT DOCUMENTS

DE 42 43 091 A1 6/1994

* cited by examiner

*Primary Examiner*—Eric Thomas
(74) *Attorney, Agent, or Firm*—William J. Uhl

(57) ABSTRACT

A solid electrolytic capacitor is disclosed. The capacitor comprises an organophosphorus material positioned between the dielectric layer and the polymeric electrolyte layer. The organophosphorus compound improves the interlayer adhesion between the dielectric and electrolyte layers.

12 Claims, 1 Drawing Sheet

SOLID ELECTROLYTIC CAPACITORS

CROSS REFERENCE TO RELATED APPLICATION

The present application claims priority from U.S. Provisional Patent Application Ser. No. 60/788,290, filed Mar. 31, 2006.

FIELD OF THE INVENTION

The present invention relates to solid electrolytic capacitors comprising a conductive polymer layer bonded to a dielectric layer, and more particularly, to solid electrolytic capacitors having improved adhesion between the conductive polymer layer and the dielectric layer.

BACKGROUND OF THE INVENTION

A solid electrolytic capacitor consists of a valve metal anode, a dielectric layer that is usually an oxide of the valve metal, an electrolyte layer that is typically formed from a conductive polymer and is positioned over the dielectric layer. A cathode layer is positioned over the electrolyte layer and the structure is encapsulated in a dielectric plastic.

For optimum usage, the electrolytic capacitor must have low current leakage and be resistant to external stresses. Significant current leakage can result if the adhesion between the electrolyte layer and the dielectric layer fails. Also, series resistance across the interface between the dielectric layer and electrolytic layer can be minimized by improved adhesion and wetting. If the capacitor is subjected to external stresses, the adhesion between these layers may suffer, and the series resistance can increase. Therefore, it would be desirable to enhance the adhesion between the conductive polymer layer and the dielectric layer.

SUMMARY OF THE INVENTION

The present invention provides for a solid electrolytic capacitor comprising:
(a) an anode,
(b) a dielectric material covering the surface of the anode,
(c) a layer of an organophosphorus material at least partially covering the dielectric layer,
(d) a layer of a conductive polymer at least partially covering layer (c) and optionally serving as a cathode and when not serving as a cathode,
(e) a cathode layer positioned on layer (d).

The conductive polymer layer can contain $\pi$ conjugation, and optionally the organo group of the organophosphorus material is a $\pi$ conjugated oligomer or polymer.

DETAILED DESCRIPTION

Figure 1:
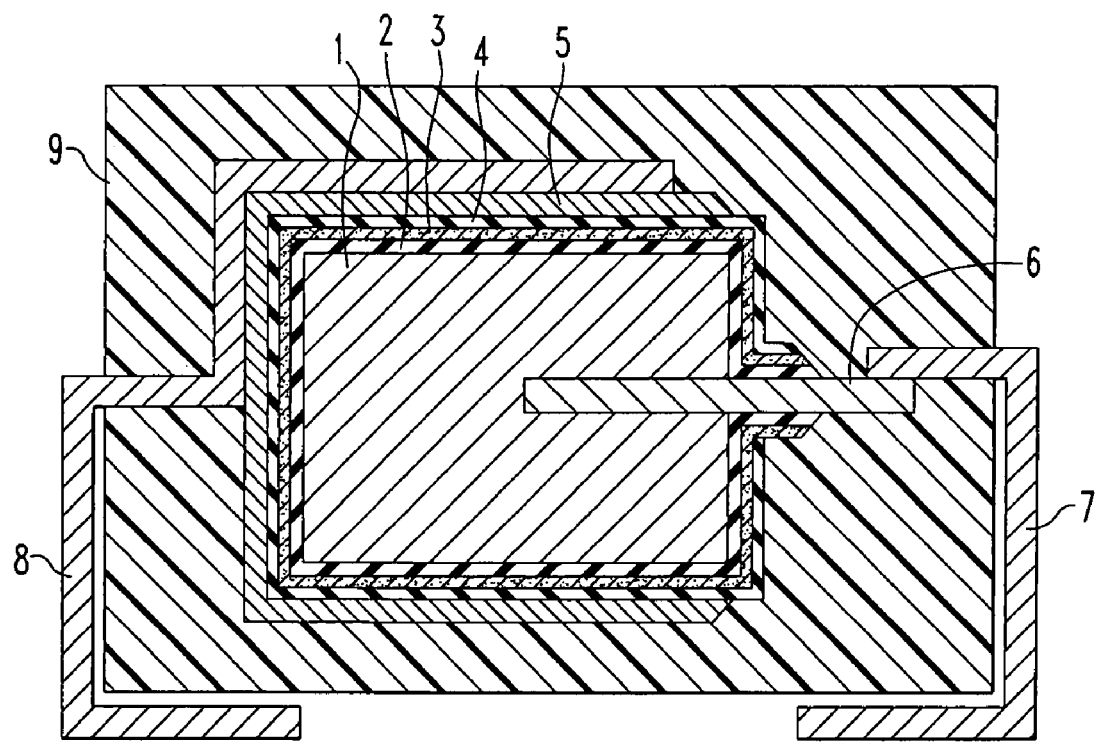
FIG. 1 is a schematic cross-sectional view of a solid electrolytic capacitor according to the present invention.

Referring to FIG. 1 the capacitor comprises an anode 1 which may be a sintered valve metal such as aluminum, tantalum, niobium, silicon and titanium and a dielectric coating 2 typically formed by oxidation of the anode material, that is, an oxide of aluminum, tantalum or niobium.

The capacitor comprises an electrolyte layer 4 and a cathode layer typically a graphite-silver paste layer 5. Positioned between the electrolyte layer 4 and the dielectric layer 2 is a layer of an organophosphorus material 3. An anode terminal 7 is connected to the anode lead member 6 inserted into the anode body 1 from one end surface thereof. A cathode terminal 8 is connected to the cathode layer 5 and the capacitor is sealed with an exterior resin 9 such as an epoxy or a phenolic resin.

The electrolyte layer 3 is formed from an electrically conductive (includes semi conductive) polymer. Examples of electrically conductive polymers are $\pi$ conjugated polymers such as polyaniline, polythiophene, polypyrrole, polyacetylene, polyphenylene and poly(p-phenylene-vinylenes).

Positioned between the electrolyte layer 4 and the dielectric layer 2 is a coupling or an adhesive layer 3 comprised of an organophosphorus compound in which the organo group improves adhesion of the conductive polymer. The organo group may have a $\pi$ conjugated subsistent and may be a monomeric, oligomeric or polymeric subsistent, and may be comprised of the same monomer units that are used in forming the electrically conductive polymer layer. For example, if the electrically conductive polymer is a polythiophene type, the organo group of the phosphorus material will also be a thiophene monomer, polymer or oligomer. It should be understood that by the same monomers is meant the same family of monomers. For example, electrically conductive polythiophene polymers may be prepared from 3-alkyl substituted thiophene monomers or may be prepared from 3,4-ethylenedioxythiophene monomers. The organo group of the organophosphorus material can be an oligomer or polymer derived from either of these monomers or simply from thiophene itself.

Figure 2:
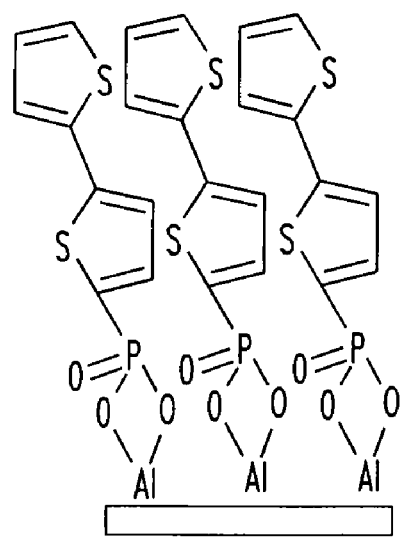
FIG. 2 shows an oligo thiophene substituted phosphorus material bonded to an aluminum oxide dielectric layer.

Preferably, the organophosphorus material serves to couple or adhesively bond the electrically conductive polymeric layer 4 to the dielectric layer 2. Bonding can be accomplished by using an organophosphorus acid that reacts with the valve metal oxide dielectric layer to form stable metal phosphonate bonds. In addition, the layer that forms is self-assembled with the organo $\pi$ conjugated moiety extending outwardly from the dielectric layer in an ordered fashion. FIG. 2 shows an oligo thiophene substituted phosphonic acid bonded to an aluminum oxide dielectric layer. The oligo thiophene moiety provides a compatible surface that adheres well to the subsequently applied polythiophene electrolyte layer 4. Consequently, the adhesion of the electrolyte layer 4 to the dielectric layer 2 is significantly improved through the use of the organophosphorus interlayer 3. For example, 3,4-ethylenedioxythiophene monomer can be polymerized in situ as generally described in U.S. Pat. No. 6,987,663 onto the oligo thiophene substituted phosphorus acid layer. The oligo thiophene moieties possibly participate in the polymerization to more securely bond the poly(3,4-ethylenedioxythiophene) layer to the dielectric layer 2.

The organophosphorus compound can be applied to the dielectric layer in the form of a dilute solution. Suitable solvents include alcohols such as ethanol, tetrahydrofuran, ethyl acetate, dichloromethane and acetone.

The concentration of the organophosphorus compound can range from about 0.01 micromolar to as high as the upper limit of the solubility of the organophosphorus compound in the solvent, typically from about 0.1 micromolar to about 100 micromolar, from about 0.1 millimolar to about 10.0 millimolar.

The solution of the organophosphorus compound can be applied by conventional techniques such as dipping, spraying and fogging. Depending on the concentration of the solution and method of application, coatings as thin as a monolayer may be applied. Repeated applications will build film thickness; however, thin films of monolayer or slightly thicker (2-10 layers) are preferred.

After the solution is applied to the substrate and the solvent is allowed to evaporate, the applied layer on the substrate typically is treated to enhance bonding directly to the substrate. The applied layer can be treated with heat and/or electromagnetic radiation, such as microwave radiation (e.g., 2450 MHz or a wavelength of about 12 cm). In some embodiments, the applied layer is exposed to radiant and/or induction heating, for example, to a temperature of 50° C. to about 200° C. (e.g., about 150° C.) for about 30-120 seconds.

Without wishing to be bound by theory, it is believed that treatment of the applied layer of an organophosphorus acid causes a dehydration reaction that forms a bond between the phosphorus of the applied acid and the oxygen of the dielectric layer 2. Referring to FIG. 2, which shows application of an oligo thiophene substituted phosphonic acid to an aluminum oxide surface, application of the acid results in proton transfer from the acid to hydroxyl and μ-oxo groups located on the aluminum oxide surface. Proton transfer to μ-oxo groups form hydroxyl groups, and the phosphonate is bonded to the surface via a first phosphorus-oxygen bond. Another proton is transferred from the acid to hydroxyl groups, and water is eliminated, and the phosphonate is further bonded to the surface via a second phosphorus-oxygen bond.

Examples of organophosphorus acids are organo phosphoric acids, organo phosphonic acids and/or organo phosphinic acids including derivatives thereof. Examples of derivatives are materials that perform similarly as the acid precursors such as acid salts, acid esters and acid complexes. The organo group of the phosphorus acid may be a monomeric, oligomeric or polymeric group and may contain π conjugation. Examples of phosphorus acids are phosphoric acids, phosphonic acids and phosphinic acids including derivatives thereof.

Examples of phosphoric acids are compounds or a mixture of compounds having the following structure:

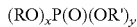
(RO)$_x$P(O)(OR')$_y$, wherein x is 1-2, y is 1-2 and x+y=3, R is an organic radical that may have π conjugation, where R' is H, a metal such as an alkali metal, for example, sodium or potassium or lower alkyl having 1 to 4 carbons, such as methyl or ethyl. Preferably, a portion of R' is H.

Example of phosphonic acids are compounds or mixture of compounds having the formula:

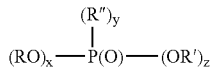

wherein x is 0-1, y is 1, z is 1-2 and x+y+z is 3. R and R" are each organo radicals and at least one of which may have π conjugation. R' is H, a metal, such as an alkali metal, for example, sodium or potassium or lower alkyl having 1-4 carbons such as methyl or ethyl. Preferably at least a portion of R' is H.

Example of phosphinic acids are compounds or mixture of compounds having the formula:

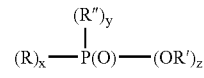

wherein x is 0-2, y is 0-2, z is 1 and x+y+z is 3. R and R" are each independently organo radicals and at least one of which may have π conjugation. R' is H, a metal, such as an alkali metal, for example, sodium or potassium or lower alkyl having 1-4 carbons, such as methyl or ethyl. Preferably a portion of R' is H.

What is claimed is:

1. A solid electrolytic capacitor comprising:
   (a) an anode,
   (b) a dielectric material covering the surface of the anode,
   (c) a layer of an organophosphorus material at least partially covering the dielectric layer, wherein the organo group of the organophosphorus material is a π conjugated oligomer or polymer, and
   (d) a layer of a conductive polymer at least partially covering layer (c).

2. The electrolytic capacitor of claim 1 wherein the conductive polymer layer is a π conjugated polymer.

3. The electrolytic capacitor of claim 2 in which the π conjugated polymer layer (d) and the π conjugated oligomeric or polymeric subsistent of the organophosphorus material are derived from the same monomers.

4. The electrolytic capacitor of claim 3 in which the monomeric units are based on thiophene.

5. The electrolytic capacitor of claim 1 wherein the anode is a valve metal.

6. The electrolytic capacitor of claim 5 wherein the valve metal is selected from aluminum, niobium, tantalum, silicon and titanium.

7. The electrolytic capacitor of claim 5 wherein the dielectric material is a valve metal oxide.

8. The electrolytic capacitor of claim 1 in which the organophosphorus material is bonded to the dielectric layer.

9. The electrolytic capacitor of claim 1 in which the organophosphorus material is derived from an organophosphorus acid or a derivative thereof.

10. The electrolytic capacitor of claim 1 in which the conductive polymer is selected from polyaniline, polythiophene, polypyrrole, polyacetylene, polyphenylene and poly(p-phenylene-vinylene).

11. The electrolytic capacitor of claim 1 in which the layer of conductive polymer serves as the cathode.

12. The electrolytic capacitor of claim 1 which has a graphite-silver cathode layer at least partially covering layer (d).

* * * * *